(12) United States Patent
Oriet et al.

(10) Patent No.: US 8,062,784 B2
(45) Date of Patent: Nov. 22, 2011

(54) SEALED COMPRESSION POLE BATTERY BOX

(75) Inventors: Leo Oriet, Rochester Hills, MI (US); Jules Cazabon, Staples (CA)

(73) Assignee: Navistar Canada, Inc., Warrenville, IL (US)

( * ) Notice: Subject to any disclaimer, the term of this patent is extended or adjusted under 35 U.S.C. 154(b) by 379 days.

(21) Appl. No.: 12/480,168

(22) Filed: Jun. 8, 2009

(65) Prior Publication Data

US 2010/0310905 A1    Dec. 9, 2010

(51) Int. Cl.
*H01M 2/24* (2006.01)
*H01M 6/42* (2006.01)
*H01M 2/00* (2006.01)
(52) U.S. Cl. .................. 429/158; 429/159; 429/163
(58) Field of Classification Search .......... 429/156–160, 429/163, 176
See application file for complete search history.

(56) References Cited

U.S. PATENT DOCUMENTS

| 5,853,058 | A  | 12/1998 | Endo et al. |
| 5,866,274 | A  | 2/1999  | Mawston et al. |
| 6,562,512 | B2 | 5/2003  | Setliff |
| 6,858,345 | B2 | 2/2005  | Amine et al. |
| 7,339,347 | B2 | 3/2008  | Elder et al. |

*Primary Examiner* — Ula C. Ruddock
*Assistant Examiner* — Thomas H. Parsons
(74) *Attorney, Agent, or Firm* — Jeffrey P. Calfa; Mark C. Bach (57) ABSTRACT

A battery assembly is disclosed having an enclosure with a top and sides, one of the sides having an opening for receiving the batteries therein. A plurality of batteries in electrical communication with one another are disposed within the enclosure. Each battery has a pair of parallel tubular openings extending through the battery, with one tubular opening being in electrical communication with the positive pole and the other tubular opening being in electrical communication-with the negative pole of the battery. When the batteries are aligned with one another within the enclosure, the tubular openings are axially aligned with each other. A conductor rod threaded at each end extends through and is in electrical communication with each tubular opening in each battery. A threaded fastener is secured to each of the threaded end of each of the conductor rods.

20 Claims, 7 Drawing Sheets

FIG. 1

PRIOR ART

SEALED COMPRESSION POLE BATTERY BOX

BACKGROUND

Embodiments described herein relate to the field of motor vehicle battery assemblies, and in particular to a sealed compression pole battery box or enclosure containing an array of individual batteries disposed within the enclosure in electrical communication with one another and maintained clamped together via a positive and negative conductor rod threaded at each end extending through one of a pair of openings extending through the battery array.

Commercial trucks and buses are typically provided by original equipment manufacturers ("OEMs") with battery boxes that often carry up to four or more batteries. Such battery boxes are typically open flat pans with the batteries arranged in side by side fashion, with the batteries connected via battery cables connected to the terminals of each of the batteries. A maze of battery tie down brackets and fasteners is often encountered.

These battery boxes, and the batteries and battery cables disposed therein, are high maintenance parts and often require repair or replacement. Any operator error downtime attributed to the battery box and its contents is therefore significant. Initially, or over time as maintenance is performed, battery box clutter, cabling mess and disorder often results. Also, the relays and high power fuses creates relatively complex and relatively expensive packaging issues for such supporting components.

Additional problems associated with such battery boxes are relatively high assembly labor costs due to the high assembly line labor content. Part complexity due to non-standardized construction has also contributed to elevated part costs, typically due to the expensive jumpers with connectors at each end. Overall, the total number of components is relatively high. Assembly difficulty is also encountered, as jumpers were often misplaced or lost when not in use. Insufficient mechanical interlock between battery poles and cables often causes erratic and unpredictable mechanical electrical contacts. In such battery boxes, the exposed positive terminals are sources of high amperage shorts to all truck metal surfaces, where the negative grounded pole completes the electrical circuit. If a poor electrical connection occurs, reduced cranking amps from batteries downstream occurs. Also, reduced charging for batteries downstream of a poor electrical connection often results.

Often, the battery boxes are exposed to the elements in order to facilitate maintenance. Due the exposed nature of the battery box, the battery connections are exposed to water and road salt, causing corrosion, which is a source of accidental high amp electrical shorts. Battery pole corrosion results in increased electrical resistance and heat generation. Batteries downstream of a corroded electrical connection do not get adequate charging from the alternator and therefore do not contribute their full potential of cranking amps. Corroded electrical connections also contribute to "no start" vehicle downtime.

Corrosion caused by water, road salt and loose battery connections also increase electrical resistance resulting in the generation of heat. It is generally understood that heat generated at the battery poles greatly reduces battery life and contributes to "no-start" downtime. Shortened battery life is also caused by erratic charging and heat generated from the electrical resistance of poor or corroded connections. Such heat also generates battery cable insulation decay, which further created shorts and damage.

Such battery boxes are also ergonomically deficient. Operators and maintenance person must perform repairs or replacement in awkward environments and often in awkward physical positions, for example when bending jumpers between terminals. When conducting such maintenance, the operators and mechanics of such battery boxes must use prudence when working in the battery box to avoid shorting the batteries. All the exposed positive terminals were sources of high amperage shorts by wrenches or spanners that are sometimes dropped, creating a short circuit between the positive terminal nut and all metal negative grounded surfaces. Repetitive strain disorders are not uncommon.

Drivers and mechanics have tried a variety of techniques to address the issues described above. These precautions and procedures included: stud terminal batteries used to apply greater joint clamp load, greasing the terminals with axle grease, pouring Coca-Cola weekly on the terminals, brushing water and baking soda on the terminals at each oil change, power-washing the battery box when washing the trucks, periodically tightening the battery pole fasteners, periodically disassembling and manual cleaning the terminals, periodically polishing the terminals and cables with steel wool, and steel brushing of the pole and terminals. Notwithstanding these efforts, product design improvements that enhance product reliability with reduced battery box clutter, and cabling mess, with also a location for convenient packaging of relays and high-powered fuses, were still desired.

SUMMARY

One embodiment provide a battery assembly comprising an enclosure having a top and side walls forming the enclosure. One of the side walls has an opening for receiving a plurality of batteries in electrical communication with one another and disposed within the enclosure. Each of the plurality of batteries has a pair of parallel tubular openings extending through the batteries. One of the tubular openings is in electrical communication with a positive pole of the battery and the other of the tubular openings is in electrical communication with a negative pole of the battery, such that when the batteries are aligned with one another within the enclosure, each of the positive tubular openings are axially aligned with each other and each of the negative tubular openings are axially aligned with each other. A positive conductor rod extends through and is in electrical communication with the positive tubular openings in each of the batteries. A negative conductor rod extends through and is in electrical communication with the negative tubular openings in each of the batteries. A fastener is secured to each of the ends of each of the conductor rods and applies a compression load and secures the batteries within the enclosure.

Another embodiment provides a battery assembly comprising an enclosure having a top and side walls forming the enclosure. One of the side walls has an opening for receiving a plurality of batteries therein. Each of the plurality of batteries is in electrical communication with one another disposed within the enclosure. Each of the batteries has a pair of parallel tubular openings extending through the batteries. One of the tubular openings is in electrical communication with a positive pole of the battery and the other of the tubular openings being in electrical communication with a negative pole of the battery, such that when the batteries are aligned with one another within the enclosure, each of the positive tubular openings are axially aligned with each other and each of the negative tubular openings are axially aligned with each other. A pair of conductor spacers is disposed between the batteries. One of the conductor spacers is a positive conductor spacer having a central orifice aligned with and in electrical communication with the positive tubular openings in each of the batteries between which it is disposed and the other of the conductor spacers is a negative conductor spacer having a central orifice aligned with and in electrical communication with the negative tubular openings in each of the batteries between which it is disposed. A positive conductor sleeve is in electrical communication with and extends through each of the positive tubular openings in each of the batteries. A negative conductor sleeve is in electrical communication with and extends through each of the negative tubular openings in each of the batteries. A positive conductor rod is provided with a hex head at one end and a threaded end at the opposite end. The positive conductor rod extends through the positive tubular openings and conductor sleeves and threaded directly into a main power bus via a threaded weld nut. A negative conductor rod is provided with a hex head at one end and a threaded end at the opposite end. The negative conductor rod extends through the negative tubular openings and conductor sleeves and is threaded directly into the main power bus via a threaded weld nut. The hex head and the threaded ends of each of the conductor rods apply a compression load and secure the batteries within the enclosure.

DETAILED DESCRIPTION

Figure 1:
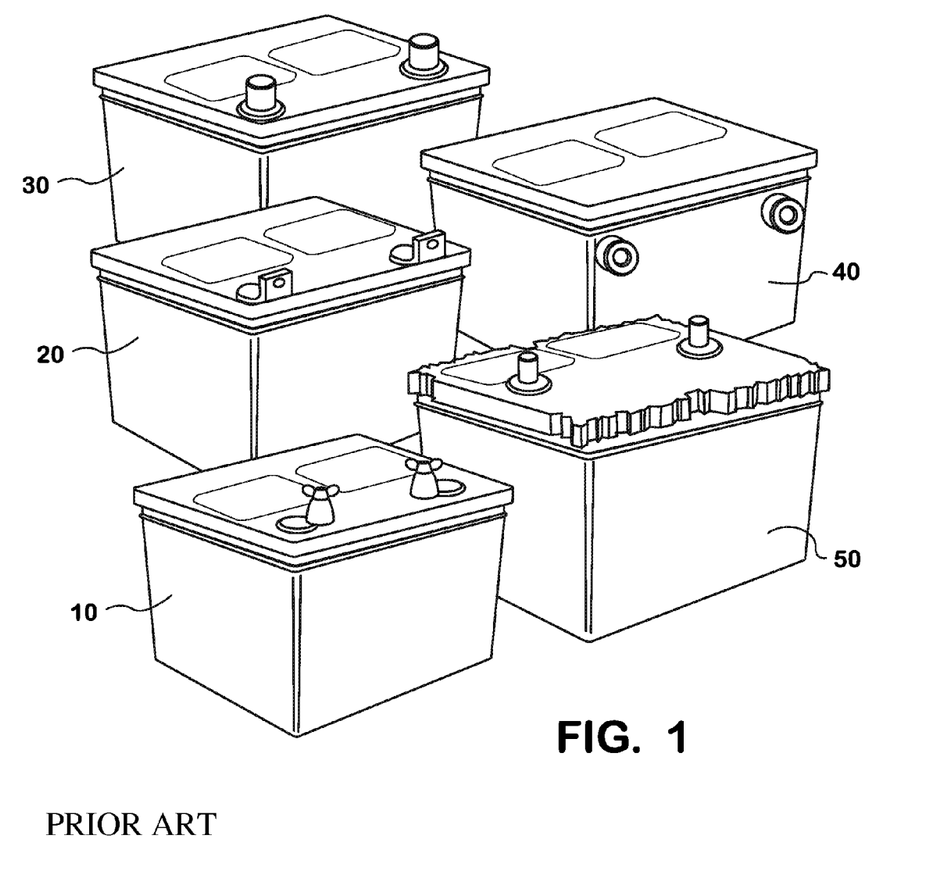
FIG. 1 shows a perspective view of the various types of motor vehicle batteries used in the battery boxes.

As noted above, commercial trucks and buses are often provided with prior battery boxes, carrying up to four or more batteries. Such battery boxes are open flat pans with the batteries arranged in side by side, with the batteries connected in parallel via battery cables connected to the terminals of each of the batteries. Shown in FIG. 1 are the various batteries typically employed for such applications. These include battery 10 equipped with combination S.A.E. and stud terminals, battery 20 equipped with "L" terminals, battery 30 equipped with S.A.E. post terminals, battery 40 equipped with side terminals and battery 50 equipped with stud terminals. These batteries and their associated battery cables, and the boxes onto which they are placed in the vehicle, are high maintenance parts and often require repair or replacement, with the attendant drawbacks previously discussed.

The battery assembly 100 employing the sealed compression pole battery box or enclosure 102 of the present disclosure eliminates these drawbacks, is generally shown in FIGS. 2 through 9, and is applicable to all commercial trucks and bus product offerings.

Figure 2:
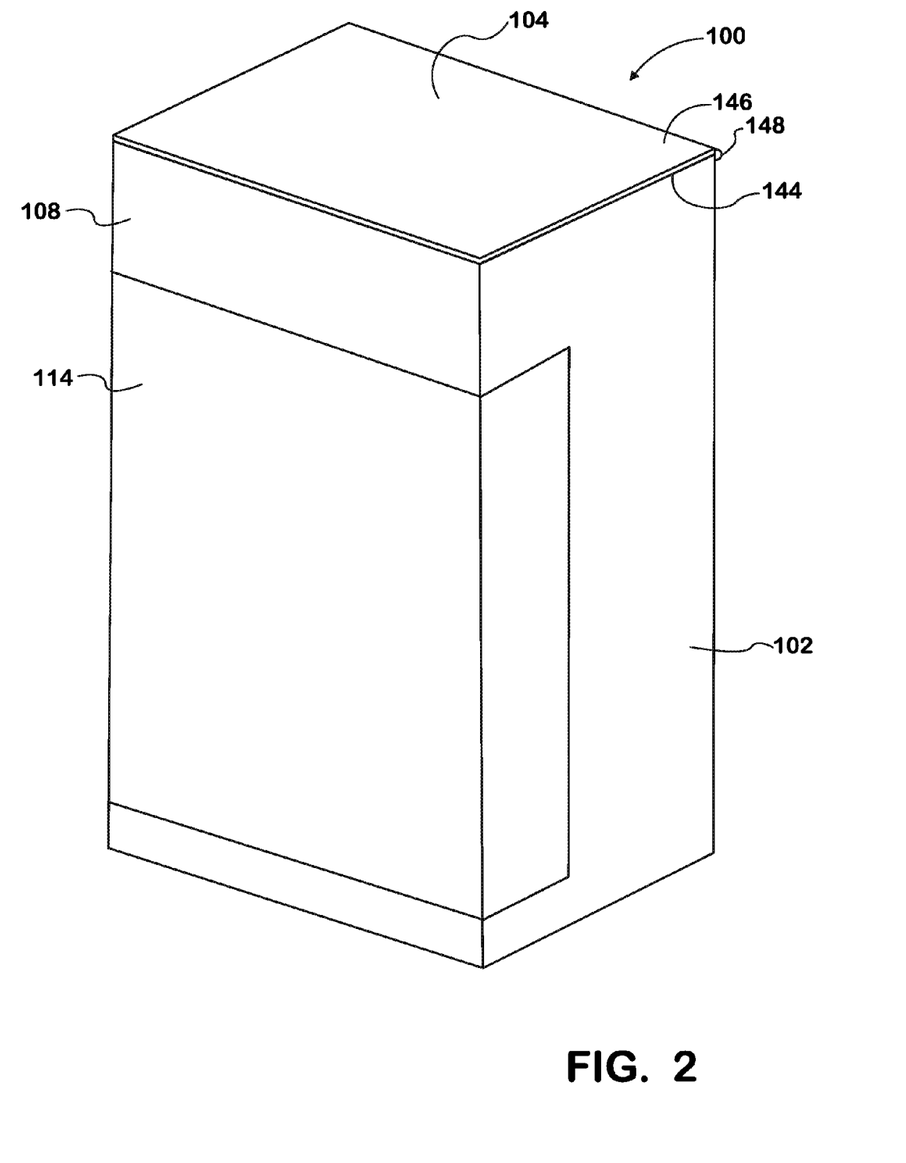
FIG. 2 shows a perspective view of an embodiment of the disclosed battery assembly with the battery snap cover attached.
Figure 3:
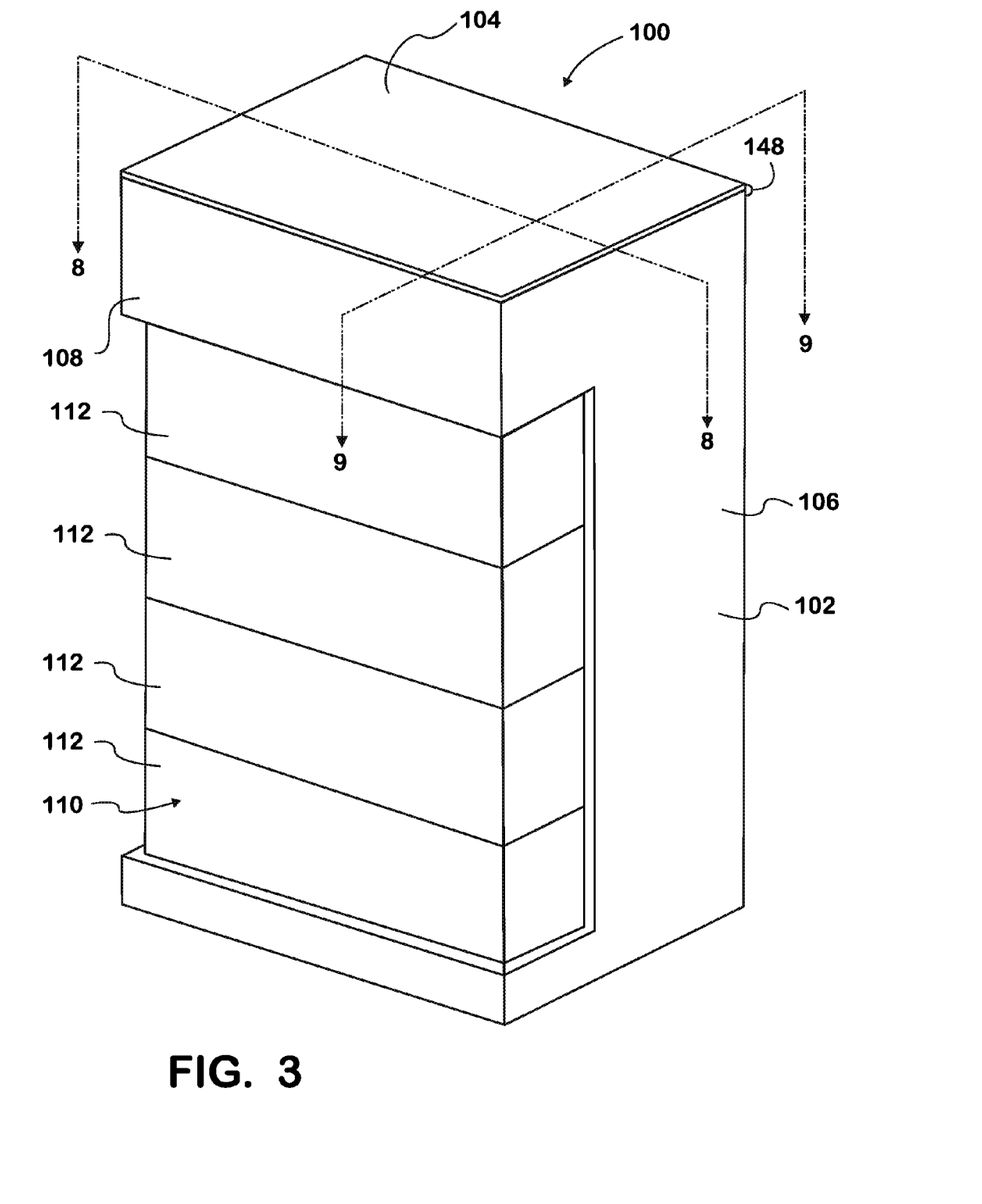
FIG. 3 shows a perspective view of the disclosed battery assembly with the battery snap cover detached and the batteries exposed.

The main features of the disclosed battery assembly 100 include an enclosure 102 having a top wall 104 and side walls 106 forming the enclosure, where one of the side walls 108 has an opening 110 for receiving a plurality, two or more, such as four, of batteries 112 disposed therein. The enclosure 102 can be fabricated from various materials, such as steel, aluminum and plastics. A battery cover snap lid 114, shown in FIG. 2, is adapted to snap over and seal opening 110, as is known in the art using shingling principles to keep out water.

The batteries 112 may be 12 volt lead acid batteries having a plurality of electrically interconnected cells, as is known in the art, adapted for use in motor vehicles. As shown in FIGS. 4 through 9, each of the batteries 112 has a pair of parallel tubular openings 116, 118 extending through the batteries. The positive tubular opening 116 is in electrical communication with the positive pole 120 of the battery and the negative tubular openings 118 is in electrical communication with the negative pole 122 of the battery. The batteries 112 are aligned with one another within the enclosure 102 such that the positive pole tubular openings 116 are axially aligned with each other and the negative pole tubular openings 118 are axially aligned with each other, thus connecting two or more (such as four) batteries in parallel with each other.

Figure 5:
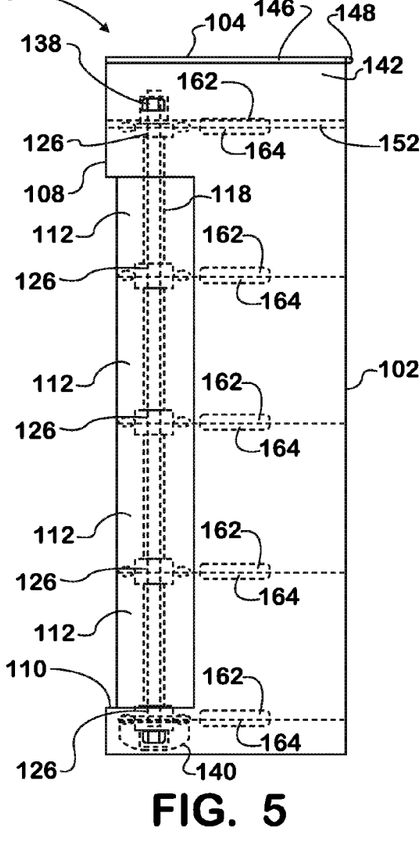
FIG. 5 shows a composite internal side view of the disclosed battery assembly.
Figure 6:
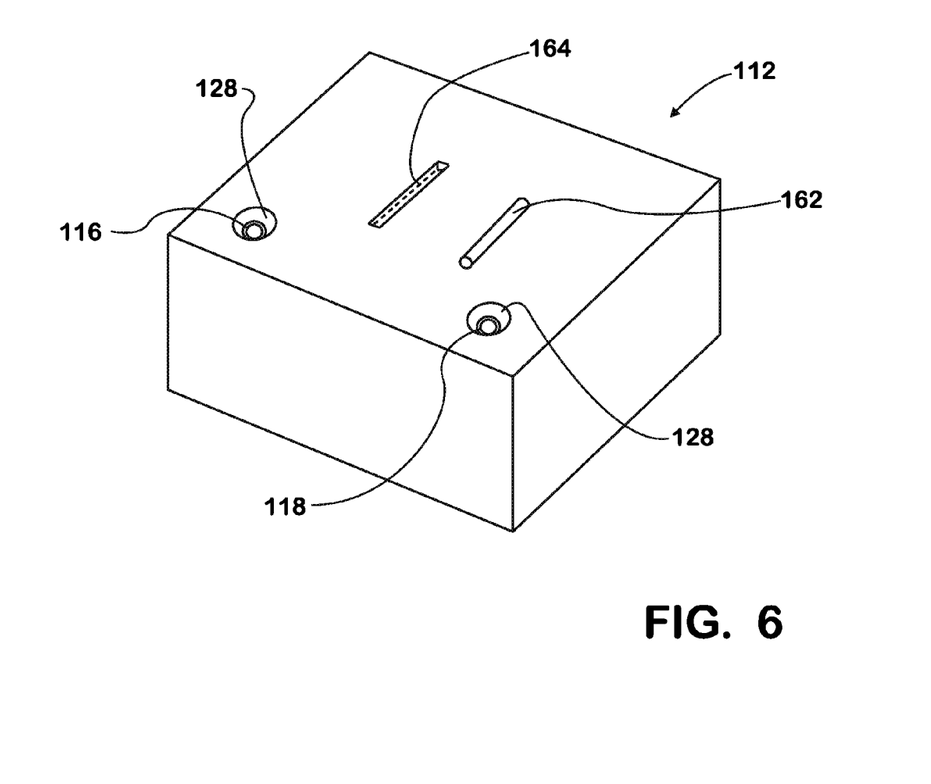
FIG. 6 shows a perspective view of a battery adapted for use in the disclosed battery assembly.
Figure 7:
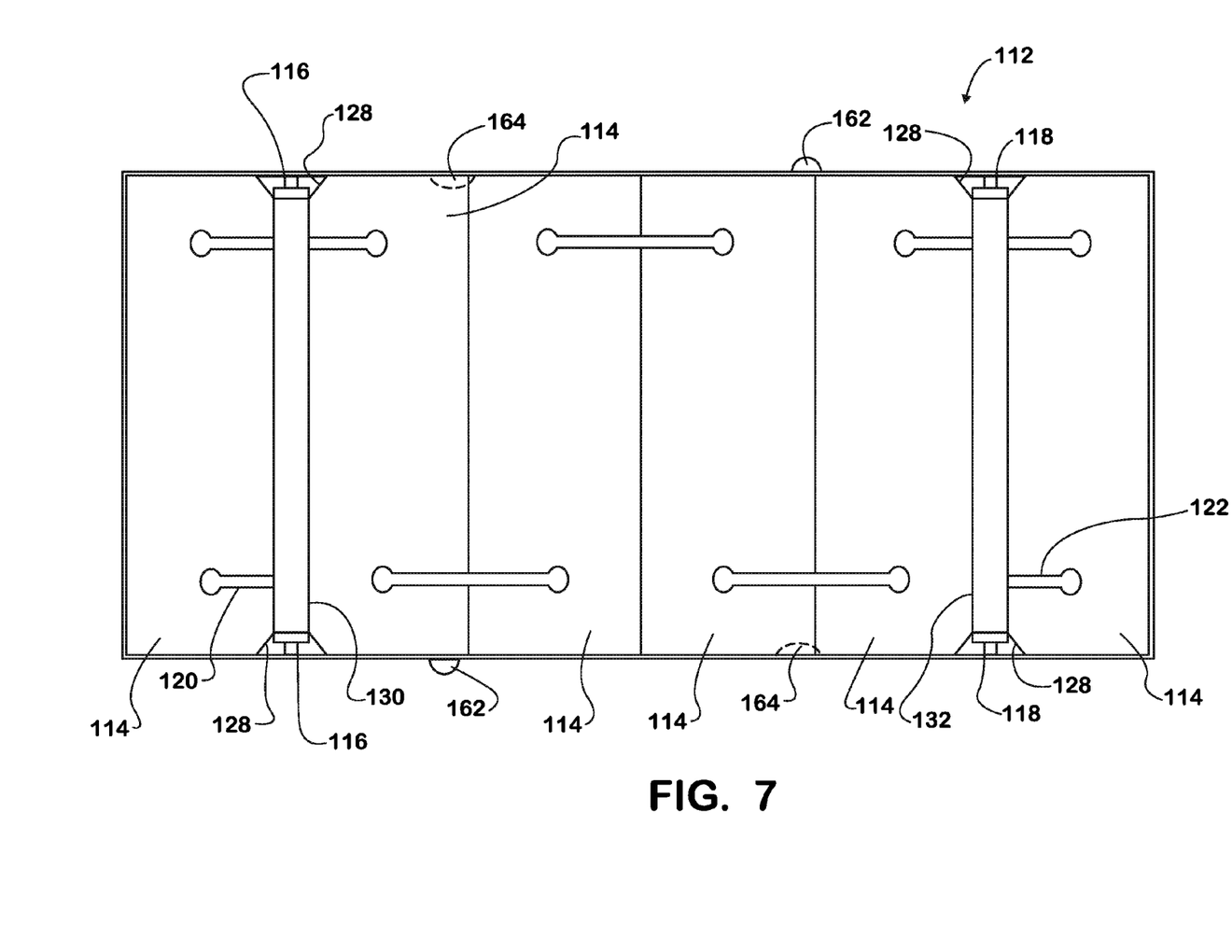
FIG. 7 shows an internal view of a battery adapted for use in the disclosed battery assembly.
Figure 8:
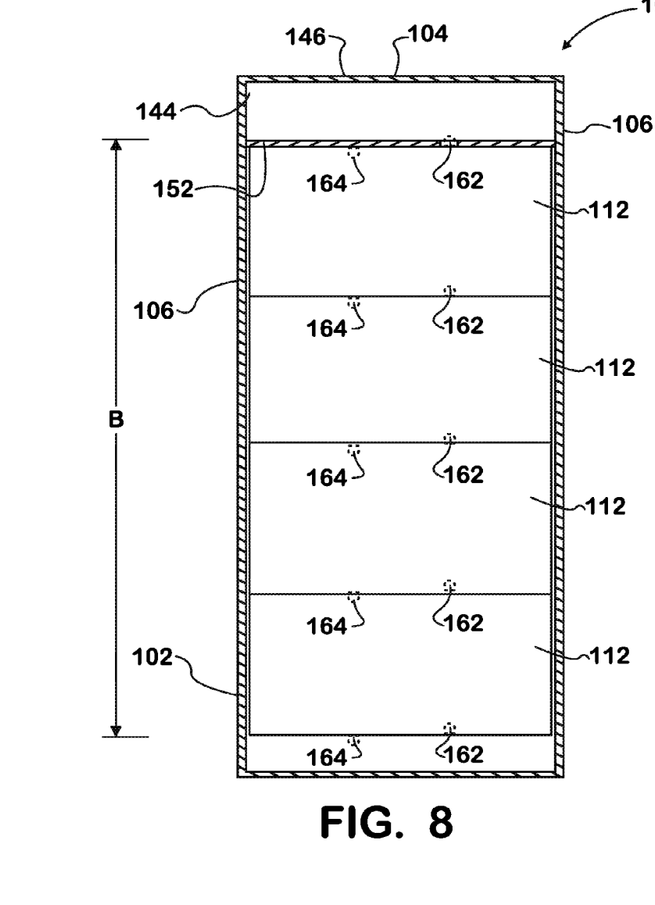
FIG. 8 shows a top view of the internal male and female interlock between the batteries disclosed in the sealed battery assembly taken along the line 8-8 in FIG. 3.

Conductor spacers 124 are disposed between the batteries, each having a central orifice 126, as shown in FIG. 5, aligned with and in electrical communication with the positive tubular openings 116 and negative tubular openings 118 in each of the batteries 112 between which they are disposed. Each of the conductor spacers are urged against an electrically conductive recess 128 at the end of each of the positive tubular openings 116 and negative tubular openings 118, as discussed below and shown in FIGS. 6 and 7.

A positive conductor sleeve 130 is in electrical communication with and extends through each of the positive pole tubular openings 116 in each of the batteries 112. A negative conductor sleeve 132 is in electrical communication with and extends through each of the negative pole tubular openings 118 in each of the batteries 112.

A positive conductor rod 134 having a threaded end extends through and is in electrical communication with the positive tubular openings 116 and positive conductor sleeve 130 in each of the batteries 112 and a negative conductor rod 136 having a threaded end at each end extends through and is in electrical communication with the negative tubular openings 118 and negative conductor sleeve 132 in each of the batteries 112. The opposite end of each of the positive and negative conductor rods has a hex head 139 for rotationally driving the rods 134, 136. Each of the threaded ends of each of the conductor rods 134, 136, is threaded into fasteners 138, respectively, to apply a compression load on and secure the batteries disposed within the enclosure 102. In one embodiment, a compressive load of at least 15,000 lbs. force (66,723 N) is applied to ensure minimal electrical resistance of the connections between the batteries 112. A removable conductor rod cover 140 is disposed over and seals the bottom end of each of the positive and negative conductor rods 134, 136, respectively. To remove the rod covers 140, the rod covers 140 may be unscrewed from threaded base 141, shown in FIG. 9. Optionally, the rod covers 140 are tethered to the assembly 100 to insure against loss.

The electrical components 150 for regulating the operation of the batteries, such as high power fuses and relays, may be disposed within a waterproof electrical box 142, which protects the electrical components from contamination from the elements. The waterproof electrical box 142 may be disposed at one end of the enclosure 102 and provided with assess opening 144 and sealable door 146 attached having an open and closed position via hinge 148 to form an end of the enclosure 102. A bulkhead 152 having openings 154, 156 against which the batteries 112 may be clamped forms a bottom wall of the waterproof electrical box 142. In one embodiment, the opening 154 is aligned with the positive tubular openings 116 and the opening 156 is aligned with the negative tubular openings 118, such that the positive and negative conductor rods 134, 136 may be extended through the openings 154, 156 to clamp the batteries against the bulkhead 152 when assembled.

In one embodiment, the threaded fasteners 138 are weld nuts physically attached to the bulkhead 152 and aligned with the openings 154, 156 in the bulkhead. Each end of the conductor rods 134, 136 are threaded into the fixed threaded fasteners 138, which are electrically coupled to the main power bus bars contained within the waterproof electrical box 142. Thus, the conductor rods are electrically coupled directly to the electrical components 150. O-ring seals 160 may be provided to the seal the waterproof electrical box 142 about the openings 154, 156.

Due the central location of the electrical components 150, such as the electrical panel that houses all wires, cables relays, and high power fuses, within the waterproof electrical box 142, electrically connecting the electrical components 150 to the two conductor rods 134, 136 via an integrated bus or cables 166 is very straightforward. Moreover, the relays can be combined into fewer electrical busses. Wiring harness lengths can be reduced, with less material and cost. Assembly is easier and can be modularized for faster assembly or replacement.

Thus, when necessary to replace or repair any of the electrical components 150, only the door 146 need be opened to expose the contents of the waterproof electrical box 142, which are otherwise completely protected from the environment and completely accessible for such replacement or repair. One embodiment provides O-ring seals 160 between the batteries, each of the O-ring seals having a central orifice aligned with and in electrical communication with the positive and negative positive tubular openings 116, 118, respectively, in each of the batteries 112 between which it is disposed.

As shown, the batteries 112 are situated in abutting relation one to the other within the enclosure 102, such that an overall battery assembly length B is created. Also, the upper and lower edge of the opening 110 defines an opening length O, which is may be less than the length of the overall battery assembly when clamped together. This difference in length results in an integrated battery tie down built into wall 108 that prevents the batteries 112 from vertical motion when the enclosure 102 is mounted with its back wall, opposite the wall 108 and opening 110, lowermost in the vehicle.

In order to prevent one or more of the batteries 112 from being installed backwards, that is, with the positive pole 116 of one battery 112 aligned with the negative pole 118 of the adjacent battery 112, each of the batteries 112 may be provided with a male error proofing tab 162 and a female error proofing boss 164 in side by side relation disposed on both the top and bottom of each battery. The male error proofing tab 162 on the top of each battery is adapted to fit into the female error proofing boss 164 on the bottom of an adjacent battery and the male error proofing tab 162 on the bottom of each battery is adapted to fit into the female error proofing boss 164 on the top of an adjacent battery. Due to the interfitting nature of the error proofing tabs 162 and bosses 164, it is impossible to install the batteries 112 backwards.

The assembly of the battery assembly of the present disclosure is straight forward. The enclosure 102, initially being empty, is situated on its back wall with the opening 110 exposed upwardly. A first battery 112 is inserted into the opening and slid toward one end of the enclosure 102. The second battery is inserted into the opening and slid toward the opposite end of the enclosure 102. The spacers 124 are placed over each of the positive tubular openings 116 and the negative tubular openings 118 on the top and bottom, respectively, of the installed batteries, such that the spacers are an electrical communication with the positive tubular opening 116 or negative tubular opening 118 provided in each of the batteries 112. Accordingly, the conductor spacers 124 complete the circuit for and are urged against the positive conductor sleeve 130 and the negative conductor sleeve 132 of each of the positive and negative tubular openings 116, 118, respectively. An O-ring 160 is also disposed about the conductor spacer 124 to provide a sealing relationship between adjacent batteries 112 and to ensure that corrosion is minimized by encapsulating the electrical connection between batteries. In this way, the cabling so common and prevalent with battery boxes is reduced.

Figure 4:
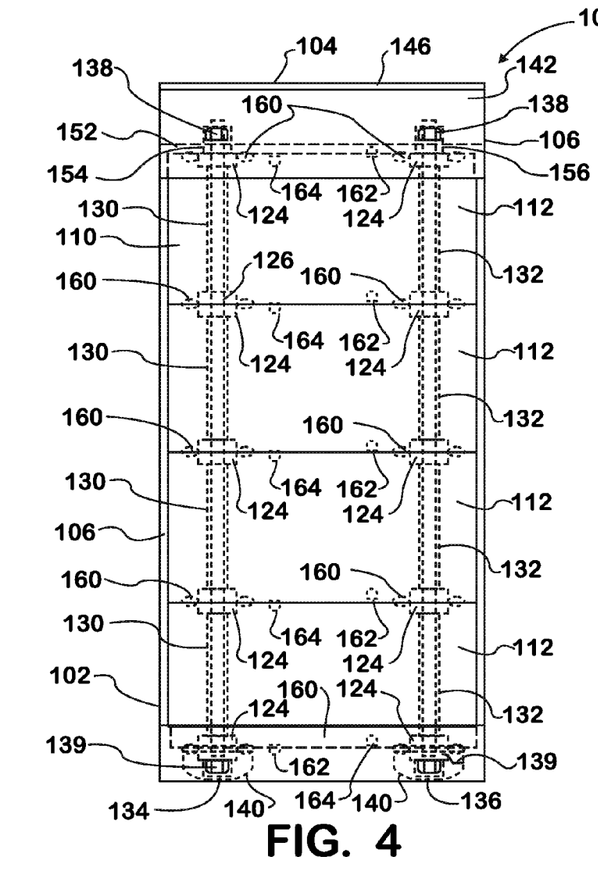
FIG. 4 shows a composite internal top view of the disclosed battery assembly.
Figure 9:
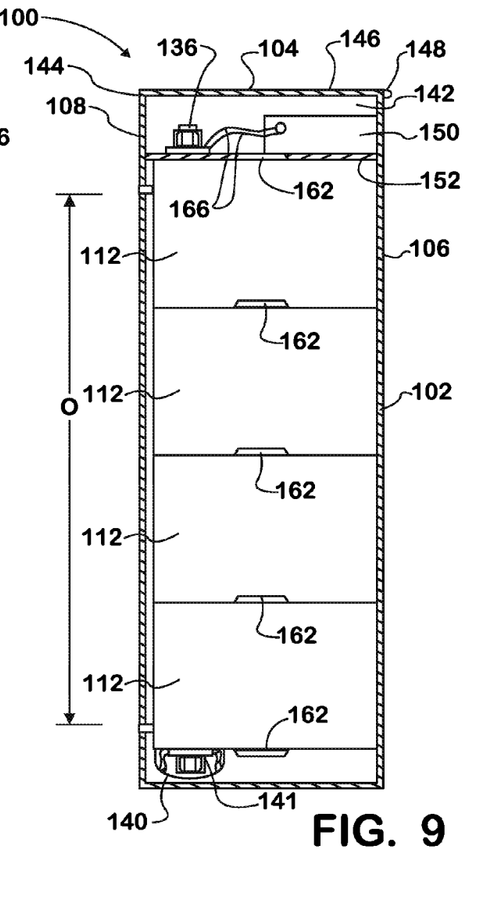
FIG. 9 shows a side view of the internal male and female interlock between the batteries of the disclosed battery assembly taken along the line 9-9 in FIG. 3.

With the already inserted batteries 112 at either end of the enclosure 102, the inserted batteries are disposed behind the upper edge of the wall 108 at the lower edge about the opening 110 and below the lower edge of the wall 108 at the low edge of the opening 110, as seen in FIGS. 4 and 9. The overhanging portion of the front walls 108 at the top and bottom of the opening 110 form an integral tie down bracket that secures the batteries 112 against movement out of the enclosure 102 and restrains the batteries 112 therein.

With the batteries 112 at either end of the enclosure 102 installed, the final two batteries 112 may be inserted into the cavity between the already installed batteries 112. Similarly, as before, the conductor spacers 124 and O-rings 160 are positioned between the batteries 112 in order to provide an electrical connection and to eliminate outside external contamination from the battery connection. Due to the interfit of the male error proofing tab 162 with the female error proofing boss 164, the batteries 112, when placed in abutting relationship with one another, can only be fitted in their proper position by the proper interfit of the error proofing measures. If the batteries create a gap between one another, this is indicative of an error in aligning the positive and negative poles 120, 122 respectively, with the battery.

With the batteries 112 situated in place, along with the conductor spacers 124 and O-rings 160 properly configured, the positive conductor rod 134 is inserted into and through the tubular openings 116 in each of the batteries 112 and through the opening 154 in the bulkhead 152. The fastener 138 attached to the bulkhead 152 and the hex end 139 of the threaded positive rod generate a clamping load of at least 15,000 pounds force (66,723 N) by the installation and torque tightening of the positive conductor rod 134. The protective cover 140 is applied to the positive conductor rod 134 and hex head 139. The bottom of the enclosure 102 may remain open as the batteries contained within are largely protected from the elements in the electrical connections therein are completely enclosed within the enclosure 102. The door 146 of the electrical box 142 is then closed to protect not only the upper fasteners 138 of the rod, but also the electrical components 150 contained within the waterproof electrical box. The installation of the negative conductor rod 136 is the same.

It is anticipated that far fewer repairs of the battery brackets and tie downs as well as the battery cabling connecting the battery terminals one to the other is desired. It is entirely expected that the frequency and the necessity for such repair and replacement will be dramatically reduced, if not entirely eliminated. However, in the event that a repair or replacement of a battery is necessary, it is accomplished quite readily without significant risk to the components contained within the battery assembly 100. The assembly procedures are simply reversed with the conductor rods 134, 136 being withdrawn. The batteries 112 are then allowed to separate sufficiently to withdraw or extract the one or more of the batteries 112 at issue and replacement of the same is readily accomplished by reverse of the steps and processes.

One feature of the disclosed battery assembly 100 is a convenient method of disconnecting the battery assembly 100 from the electrical components of the vehicle. To do so, only one of the positive or negative conductor rods 134, 136 need be withdrawn from the assembly 100 to disconnect the batteries from the vehicle. Likewise, mere removal of the conductor rod covers 140 exposes the ends of the positive and negative conductor rods 134, 136, providing safe and convenient access to the terminals of the disclosed battery assembly for the attachment of booster cables to provide additional cranking amps to start the vehicle. The positive conductor rod 134 is somewhat lighter in the color than the negative conductor rod 136, indicating its positive polarity. Likewise, the rod cover 140 for the positive conductor rod 134 is colored red and/or affixed with a "P," while the rod cover 140 for the negative conductor rod 136 is colored black and/or affixed with a "N."

At no point is there any risk of short circuit or other damage to the system due to operator error or accident. Moreover, the concentration of the batteries 112 in a central location allows OEM's to locate the battery assembly 100 of the present disclosure in a location where it is ergonomically relatively easily assessable for both battery replacement, as described above, and/or any repair that needs to be made to any of the electrical components 150 in the water proof electrical box 142.

The disclosed battery assembly creates a clean battery box, free of wires, cables, relays, and high power fuses, and is of superior quality. Operator error downtime attributed to battery box cable disorder is thus eliminated.

The waterproof electrical box 142 housing all wires, cables, relays, high power fuses and other components protects vulnerable components, with the additional benefit of easier and cheaper assembly. The use of the two conductor rods 134, 136 electrically coupled directly into the main power bus via fasteners 138 disposed in waterproof electrical box 142, in cooperation with the hex head 139, provides significant clamp load on the battery conductor tubes 116, 118 in a sealed waterproof inter-battery joint, improving connection integrity. This connection integrity is critical, as poor connections reduce cranking amps and charging for batteries 112 downstream. There are no exposed battery terminals, the traditional source of accidental high amp electrical shorts.

It should also be appreciated that while enclosure 102 for four batteries 112 is disclosed herein, it is contemplated that less than four batteries can be enclosed in the enclosure 102. Such is sometimes desired during summer months to save on weight and cost. If, for example, only two batteries 112 are to be enclosed, the conductor rods 134, 134 can be threaded along about at least half their length and threaded through the fasteners 138 and into the electrical box 142 until the two batteries 112 can be clamped between fasteners 138 and hex head 139. Of course, the size of the electrical box 142 must be increased to receive the additional length of the rods 134, 136 therein. Moreover, shorter length rods 134, 136 can be used without needing to alter the electrical box 142. Alternatively, insulated spacers of the size and crush resistance of the batteries may be added to simulate the presence of the two omitted batteries without the cost and weight penalties of an actual battery.

Battery connections exposed to water and road salt are completely eliminated. Battery pole corrosion is resolved with this battery assembly. The resulting resistance heat generation originating from connection corrosion is also eliminated, along with heat generated battery cable insulation decay—indeed, the cables are eliminated. The design is 100% safer, with no possibility of accidental shorts and high amperage explosions, thus allowing the elimination of high powered fuse holders (for fuses over 30 amps).

The battery assembly disclosed provides a protective enclosure around the batteries 112. Assembly is simpler, costs are reduced, complexity is eliminated, corrosion is prevented, and maintenance can be performed without fear of short circuits and damage to the components. More reliable electrical connections are obtained that are less likely to degrade over time.

The disclosed battery assembly 100 is also sleek and clean in appearance. It is contemplated that marketing logos or other indicia may be affixed by an OEM or aftermarket manufacturer across the entire width of the enclosure or the batteries contained therein to provide a special custom appearance in a clean looking battery assembly, adding appeal to those customers searching for a unique truck tractor.

While embodiments and example configurations have been shown and described, it is to be understood that various further modifications and additional configurations will be apparent to those skilled in the art. It is intended that the specific embodiments and configurations disclosed are illustrative, and should not be interpreted as limitations and it is to be appreciated that various changes, rearrangements and modifications may be made therein, without departing from the scope of the appended claims.

What is claimed is:

1. A battery assembly comprising:
   an enclosure having a top and side walls forming the enclosure, one of the side walls having an opening for receiving a plurality of batteries being in electrical communication with one another disposed within the enclosure,
   each of the plurality of batteries having a pair of parallel tubular openings extending through the batteries, one of the tubular openings being in electrical communication with a positive pole of the battery and the other of the tubular openings being in electrical communication with a negative pole of the battery, such that when the batteries are aligned with one another within the enclosure, each of the positive tubular openings are axially aligned with each other and each of the negative tubular openings are axially aligned with each other,
   a positive conductor rod extending through and in electrical communication with the positive tubular openings in each of the batteries and a negative conductor rod extending through and in electrical communication with the negative tubular openings in each of the batteries, and
   a fastener secured to each of the ends of each of the conductor rods applying a compression load on and securing the batteries disposed within the enclosure.

2. The battery assembly of claim 1 further comprising a pair of conductor spacers disposed between the batteries, one of the conductor spacers being a positive conductor spacer having a central orifice aligned with and in electrical communication with the positive tubular openings in each of the batteries between which it is disposed and the other of the conductor spacers being a negative conductor spacer having a central orifice aligned with and in electrical communication with the negative tubular openings in each of the batteries between which it is disposed.

3. The battery assembly of claim 1 further comprising a positive conductor sleeve in electrical communication with and extending through each of the positive tubular openings in each of the batteries and a negative conductor sleeve in electrical communication with and extending through each of the negative tubular openings in each of the batteries.

4. The battery assembly of claim 1 further comprising a waterproof electrical box and electrical components for regulating the operation of the batteries, wherein the electrical components are disposed within the waterproof electrical box and protected from contamination from external sources.

5. The battery assembly of claim 4 wherein the waterproof electrical box is disposed at an end of the enclosure and the waterproof electrical box is provided with an assess opening and a sealable door having an open and closed position forming an end of the enclosure.

6. The battery assembly of claim 5, wherein the top of the enclosure further comprises a bulkhead defining a bottom wall of the waterproof electrical box, the bulkhead further comprising a pair of openings and each of the positive tubular openings are axially aligned with each other and one of the pair of openings in the bulkhead of the enclosure and each of the negative tubular openings are axially aligned with each other and the other of the pair of openings in the top bulkhead of the enclosure, the positive conductor rod extending through one of the pair of openings in the bulkhead of the enclosure and the negative conductor rod extending through the other of the pair of openings in the top bulkhead of the enclosure.

7. The battery assembly of claim 6, wherein a pair of O-ring seals is disposed between about each of the pair of openings in the bulkhead and between the bulkhead and the batteries.

8. The battery assembly of claim 1 further comprising a waterproof sealed battery cover snap lid for sealing the opening in the enclosure, the snap lid having an open and closed position, wherein in the open position the batteries may be installed and removed from the enclosure.

9. The battery assembly of claim 1 further comprising an integrated battery tie-down to prevent motion of batteries.

10. The battery assembly of claim 1, wherein the plurality of batteries in electrical communication are arranged in abutting relation with one another within the enclosure connecting two or more batteries in parallel.

11. The battery assembly of claim 10, further comprising an integrated battery tie-down wherein the plurality of batteries in electrical communication arranged in abutting relation with one another within the enclosure form an overall battery assembly length, the integrated battery tie-down being defined by an upper and lower edge of the opening that defines an opening length less than the length of the overall battery assembly.

12. The battery assembly of claim 10, wherein the plurality of batteries in electrical communication arranged in abutting relation with one another are each provided with a male error proofing tab and a female error proofing boss in side by side relation on both the top and bottom of each battery, such that the male error proofing tab on the top of each battery is adapted to fit into the female error proofing boss on the bottom of an adjacent battery and the male error proofing tab on the bottom of each battery is adapted to fit into the female error proofing boss on the top of an adjacent battery.

13. The battery assembly of claim 1, wherein a pair of O-ring seals is disposed between the batteries, one of the O-ring seals having a central orifice aligned with and in electrical communication with the positive tubular openings in each of the batteries between which it is disposed and the other of the O-ring seals having a central orifice aligned with and in electrical communication with the negative tubular openings in each of the batteries between which it is disposed.

14. The battery assembly of claim 1, wherein each of the conductor rods have a hex head at one end and are threaded at the opposite end, the threaded end being threaded directly into a main power circuit via positive and negative threaded weld nuts.

15. The battery assembly of claim 1, further comprising a conductor rod cover disposed over and sealing the bottom end of each of the positive and negative conductor rods.

16. A battery assembly comprising:
an enclosure having a top and side walls forming the enclosure, one of the side walls having an opening for receiving a plurality of batteries therein,
the plurality of batteries being in electrical communication with one another disposed within the enclosure, each of the batteries having a pair of parallel tubular openings extending through the batteries, one of the tubular openings being in electrical communication with a positive pole of the battery and the other of the tubular openings being in electrical communication with a negative pole of the battery, such that when the batteries are aligned with one another within the enclosure, each of the positive tubular openings are axially aligned with each other and each of the negative tubular openings are axially aligned with each other,
a pair of conductor spacers disposed between the batteries, one of the conductor spacers being a positive conductor spacer having a central orifice aligned with and in electrical communication with the positive tubular openings in each of the batteries between which it is disposed and the other of the conductor spacers being a negative conductor spacer having a central orifice aligned with and in electrical communication with the negative tubular openings in each of the batteries between which it is disposed,
a positive conductor sleeve in electrical communication with and extending through each of the positive tubular openings in each of the batteries and a negative conductor sleeve in electrical communication with and extending through each of the negative tubular openings in each of the batteries,
a positive conductor rod provided with a hex head at one end and a threaded end at the opposite end, the positive conductor rod extending through the positive tubular openings and conductor sleeves and threaded directly into a main power bus via a threaded weld nut, and a negative conductor rod provided with a hex head at one end and a threaded end at the opposite end, the negative conductor rod extending through the negative tubular openings and conductor sleeves and threaded directly into the main power bus via a threaded weld nut, and
the hex head and the threaded ends of each of the conductor rods applying a compression load on and securing the batteries disposed within the enclosure.

17. The battery assembly of claim 16, wherein the plurality of batteries in electrical communication are arranged in abutting relation with one another within the enclosure and each of the batteries is provided with a male error proofing tab and a female error proofing boss in side by side relation on both the top and bottom of each battery, such that the male error proofing tab on the top of each battery is adapted to fit into the female error proofing boss on the bottom of an adjacent battery and the male error proofing tab on the bottom of each battery is adapted to fit into the female error proofing boss on the top of an adjacent battery.

18. A motor vehicle battery for use for use in an enclosure having a top and side walls forming the enclosure, one of the side walls having an opening for receiving a plurality of batteries therein in electrical communication with one another, wherein the battery comprises a generally rectangular box having a pair of parallel tubular openings extending through the battery, one of the tubular openings being in electrical communication with a positive pole of the battery and the other of the tubular openings being in electrical communication with a negative pole of the battery, such that when the battery is aligned with another battery within the enclosure, each of the positive tubular openings are axially aligned with each other and each of the negative tubular openings are axially aligned with each other, each of the batteries having a positive conductor sleeve in electrical communication with and extending through each of the positive tubular openings in each of the batteries and a negative conductor sleeve in electrical communication with and extending through each of the negative tubular openings in each of the batteries, where a positive conductor rod threaded at one end may be inserted through and extend beyond each end of the plurality of positive conductor sleeves and a negative conductor rod threaded at one end may be inserted through and extend beyond each of end of the plurality of negative conductor sleeves, and where a threaded fastener may be secured to each of the threaded ends of each of the conductor rods applying a compression load on and securing the batteries disposed within the enclosure.

19. The motor vehicle battery of claim 18, wherein the battery further comprises a male error proofing tab and a female error proofing boss in side by side relation on both the top and bottom of each battery, such that the male error proofing tab on the top of each battery is adapted to fit into the female error proofing boss on the bottom of an adjacent battery and the male error proofing tab on the bottom of each battery is adapted to fit into the female error proofing boss on the top of an adjacent battery.

20. The motor vehicle battery of claim 18, wherein a pair of conductor spacers is disposed between the batteries when installed in the enclosure, one of the conductor spacers being a positive conductor spacer having a central orifice aligned with and in electrical communication with the positive tubular openings in each of the batteries between which it is disposed and the other of the conductor spacers being a negative conductor spacer having a central orifice aligned with and in electrical communication with the negative tubular openings in each of the batteries between which it is disposed.

* * * * *